Patented Oct. 4, 1949

2,483,436

UNITED STATES PATENT OFFICE 2,483,436

THIOETHERS AND METHODS FOR OBTAINING THE SAME

George Rieveschl, Jr., Grosse Pointe Woods, Mich., assignor to Parke, Davis & Company, Detroit, Mich., a corporation of Michigan No Drawing. Application August 5, 1946, Serial No. 688,427

8 Claims. (Cl. 260—570)

This invention relates to certain basically substituted thioethers and to methods for obtaining the same. This application is a continuation-in-part of my copending application, Serial No. 531,639, filed April 18, 1944, now Patent No. 2,421,714 issued June 3, 1947.

More particularly, this invention relates to ω-N-substituted aminoalkyl benzhydryl thioethers, the free bases of which have the formula

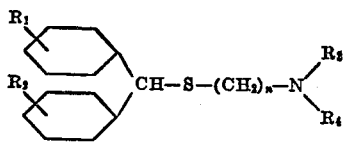

where $n$ is one of the integers two and three, $R_1$ and $R_2$ are the same or different substituents and represent hydrogen, an alkyl radical containing 1 or 2 carbon atoms or an alkoxy radical containing 1 or 2 carbon atoms, $R_3$ and $R_4$ are the same or different alkyl radicals containing 1 to 3 carbon atoms inclusive or $R_3$ and $R_4$ taken with —N< may be a saturated six-membered heterocyclic ring such as piperidine, a methyl substituted piperidine, morpholine, a methyl substituted morpholine, thiomorpholine and the like. The compounds of this invention may be obtained as the free base having the formula given above or they may be obtained in the form of their acid addition salts with organic and inorganic acids. Some typical examples of these salts are the hydrobromide, hydrochloride, phosphate, sulfate, citrate, oxalate, tartrate, salicylate, benzoate and acetate salts.

I have found that compounds of the above general formula may be obtained in high yields by the reaction of an alkali metal salt of a benzhydryl mercaptan of the formula

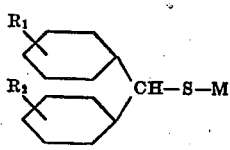

with an ω-aminoalkyl halide of the formula

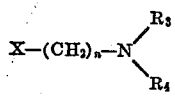

in an organic solvent or a water-organic solvent mixture. Some of the solvents which have proved satisfactory are methanol, water-methanol mixture, dilute ethanol, absolute ethanol, isopropanol, aqueous dioxane, benzene, toluene, terpentine, pyridine, di-n-butyl ether and xylene. These new thioethers may also be prepared by the reaction of a benzhydryl halide of the formula

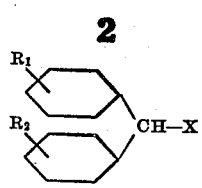

with an alkali metal salt of ω-aminoalkyl mercaptan of the formula

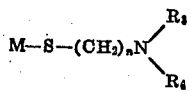

under the same conditions used to bring about the reaction between an alkali metal salt of a benzhydryl mercaptan and an aminoalkyl halide. In the above formulae $R_1$, $R_2$, $R_3$, $R_4$ and $n$ have the same significance as previously given, M is an alkali metal and X is a chlorine, bromine or iodine atom.

The compounds of the present invention are useful as antihistamine agents and as intermediates in the synthesis of other valuable organic compounds.

The invention is illustrated by the following examples.

*Example 1.—β-Dimethylaminoethyl benzhydryl thioether*

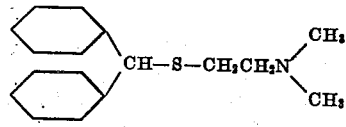

32.3 g. of S-benzhydryl isothiourea hydrobromide is dissolved in 50 cc. of ethanol and 15 g. of sodium hydroxide in 20 cc. of water added to the solution with stirring. The solution of the sodium salt of benzhydryl mercaptan thus obtained is warmed for a few minutes and then treated with a solution of 23.3 g. of β-dimethylaminoethyl bromide hydrobromide in 50 cc. of alcohol. The mixture is heated under reflux for one hour, cooled and diluted with water. The solution is extracted with ether, the ether extracts washed with water and dried. On adding an excess of alcoholic hydrogen chloride to the ether solution of the base the hydrochloride salt of β-dimethylaminoethyl benzhydryl thioether is obtained as a white solid which may be purified by recrystallization from isopropanol-ethyl acetate mixture; M. P. 181–3° C.

*Example 2.—γ-Dimethylaminopropyl benzhydryl thioether*

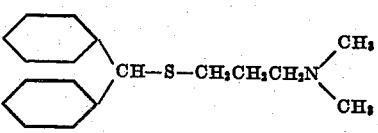

20 g. of benzhydryl mercaptan is dissolved in 200 cc. of 50% methanol containing 8 g. of sodium hydroxide and the resulting solution treated with 16.5 g. of γ-dimethylaminopropyl chloride hydrochloride. The mixture is heated under reflux for three hours, diluted with water and extracted with ether. The ether solution is extracted with 5% sodium hydroxide, washed with water and then extracted with dilute hydrochloric acid. The acidic extracts are made alkaline in the cold with 10% sodium hydroxide solution, the free base extracted with ether and the ether extracts dried. The dry ether solution is treated with an excess of dry hydrogen chloride and the white hydrochloride of γ-dimethylaminopropyl benzhydryl thioether which separates, collected and purified by recrystallization from isopropanol-ether mixture.

*Example 3.—β-Diethylaminoethyl benzhydryl thioether*

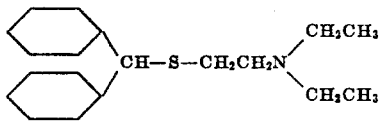

A solution containing 22.2 g. of the sodium salt of benzhydryl mercaptan and about 7 g. of free sodium hydroxide is prepared by adding a solution of 15 g. of sodium hydroxide in 30 cc. of water to a rapidly stirred solution of 32.3 g. of S-benzhydryl isothiourea hydrobromide in 100 cc. of ethanol. The solution is warmed for a few minutes and then 16 g. of β-diethylaminoethyl chloride hydrochloride in 50 cc. of alcohol added to the warm solution of the mercaptan salt. The mixture is refluxed for one hour, cooled and diluted with water. The solution is extracted with ether, the ether extracts washed with water and dried. The free base of the β-diethylaminoethyl benzhydryl thioether present in the ether solution is converted to the hydrochloride by treatment with an excess of alcoholic hydrogen chloride. The hydrochloride salt is collected, washed with ether and purified by recrystallization from isopropanol-ether mixture.

*Example 4.—γ-1-piperidylpropyl benzhydryl thioether*

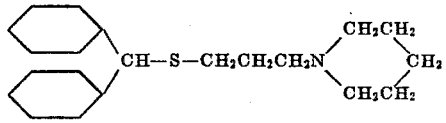

20 g. of benzhydryl mercaptan is added to 200 cc. of 70% ethanol containing 11.5 g. of potassium hydroxide. After all the mercaptan has dissolved 28.7 g. of γ-1-piperidylpropyl bromide hydrobromide is added in small portions with stirring and the resulting mixture refluxed for three hours. Most of the alcohol is removed by distillation, the residue diluted with water and extracted with ether. The ether extract is washed with water, dried and treated with an excess of dry gaseous hydrogen bromide. The hydrobromide salt of γ-1-piperidylpropyl benzhydryl thioether which separates as a white fluffy solid is collected and purified by recrystallization from isopropanol-ether mixture.

By substituting an equivalent amount of γ-(3-methyl-1-piperidyl)-propyl bromide hydrobromide for the piperidyl alkyl halide in the above procedure one obtains γ-(3-methyl-1-piperidyl) propyl benzhydryl thioether hydrobromide.

*Example 5.—β-4-morpholinylethyl benzhydryl ether*

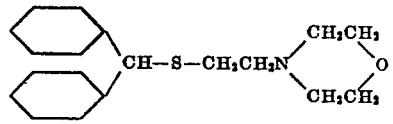

40 g. of sodium hydroxide in 70 cc. of water is added to a solution of 97 g. of S-benzhydrylisothiourea hydrobromide in 250 cc. of 95% ethanol. A yellow color develops and the odor of benzhydryl mercaptan is immediately apparent. The mixture is heated for forty-five minutes and then 55.8 g. of β-morpholinoethyl chloride hydrochloride added over a period of twenty minutes. Considerable heat is generated during the addition and the solution becomes cloudy. After the addition is complete, 10 g. of sodium hydroxide in 15 cc. of water is added, the mixture stirred for two hours and allowed to stand overnight. Most of the alcohol is removed under reduced pressure, the residue diluted with water and extracted with ether. The ether extract is extracted with two portions of dilute hydrochloric acid. On standing, the hydrochloride salt of β-4-morpholinylethyl benzhydryl ether separates from the acidic extracts. The product is collected and purified by recrystallization from isopropanol-ligroin mixture; M. P. 179–80° C.

*Example 6.—β-Di-n-propylaminoethyl 4,4'-dimethyl benzhydryl thioether*

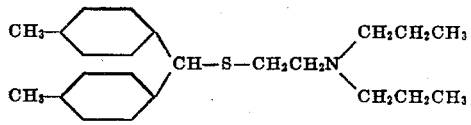

28.9 g. of β-di-n-propylaminoethyl bromide hydrobromide is added to a solution of 22.8 g. of 4,4'-dimethyl benzhydryl mercaptan in 150 cc. of isopropanol containing 11.3 g. of potassium hydroxide and the resulting mixture warmed on a steam bath for two hours. Most of the solvent is distilled off under reduced pressure, the residue diluted with water and the mixture extracted with ether. The ether extracts are washed with water, dried and the ether distilled to obtain the crude free base of β-di-n-propylaminoethyl 4,4'-dimethyl benzhydryl thioether.

The free base may be converted to its acid oxalate addition salt by adding it to a warm solution of isopropanol containing an equivalent amount of oxalic acid dihydrate. The salt which separates from the solution is collected by filtration and purified by recrystallization from isopropanol.

The citrate salt may be prepared by dissolving the crude free base in ether and adding a saturated ether solution of citric acid. The citrate which separates as a fine powder is collected and purified by repeated washing with dry ether.

*Example 7.—β-Methylethylaminoethyl 2-methoxy benzhydryl thioether*

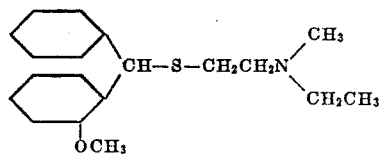

46 g. of 2-methoxy benzhydryl mercaptan is dissolved in 250 cc. of 50% methanol containing 16.5 g. of sodium hydroxide. 31.6 g. of β-methylethylaminoethyl chloride hydrochloride is added in small portions and the mixture warmed on a steam bath for two hours. Most of the methanol is removed by distillation in vacuo, the residue diluted with water and extracted with ether. The ether extracts are washed with water, dried and treated with an excess of dry gaseous hydrogen chloride to convert the free base to the hydrochloride salt. The salt is collected and purified by recrystallization from isopropanol-ligroin mixture.

The mercaptans used as starting materials may be obtained in a number of different ways. Perhaps the most convenient method of preparation consists in generating the mercaptan salt in the reaction mixture solution by treatment of the corresponding S-substituted isothiourea hydrohalide with alkali. The S-benzhydryl isothiourea hydrohalides may be obtained by heating a benzhydryl halide with thiourea in alcohol. The S-($\beta$-aminoalkyl) isothiourea hydrohalides may be prepared in a similar manner by reacting a $\beta$-aminoalkyl halide or a hydrohalide salt thereof with thiourea in alcohol. The use of these S-substituted isothiourea hydrohalides as intermediates in the preparation of the mercaptan salts is illustrated more fully in Examples 1, 3 and 5.

Attention is called to the following copending applications which are somewhat related: Serial No. 640,685, filed January 11, 1946; Serial No. 640,686, filed January 11, 1946; Serial No. 640,687, filed January 11, 1946; Serial No. 660,406, filed April 8, 1946; Serial No. 688,420, filed August 5, 1946; Serial No. 688,421, filed August 5, 1946; Serial No. 688,422, filed August 5, 1946; Serial No. 688,423, filed August 5, 1946; Serial No. 688,424, filed August 5, 1946, now Patent No. 2,453,729; Serial No. 688,425, filed August 5, 1946; Serial No. 688,426, filed August 5, 1946, now Patent No. 2,437,711; Serial No. 739,985, filed April 8, 1947, now Patent No. 2,427,878; Serial No. 751,983, filed June 2, 1947, now Patent No. 2,454,092; Serial No. 751,984, filed June 2, 1947; Serial No. 751,985, filed June 2, 1947, now Patent No. 2,455,949; Serial No. 780,099, filed October 15, 1947; Serial No. 15,257, filed March 16, 1948; and Serial No. 33,432, filed June 16, 1948.

What I claim as my invention is:

1. A compound of the class consisting of a free base and its acid addition salts, said free base having the formula

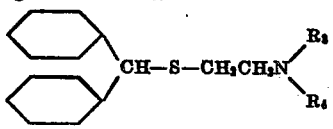

where R₃ and R₄ are members of the class consisting of alkyl radicals containing 1 to 3 carbon atoms inclusive and further members wherein R₃ and R₄ taken together with —N< form a saturated six-membered heterocyclic ring.

2. A compound of the class consisting of a free base and its acid addition salts, said free base having the formula

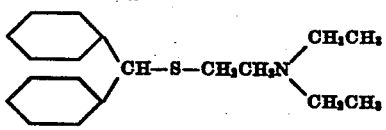

3. A compound of the formula

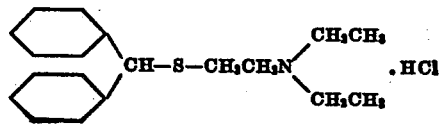

4. A compound of the class consisting of a free base and its acid addition salts, said free base having the formula

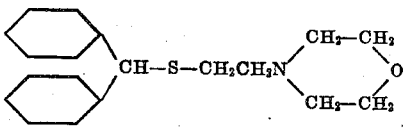

5. A compound of the formula

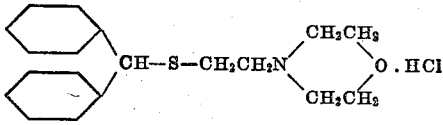

6. A compound of the class consisting of a free base and its acid addition salts, said free base having the formula

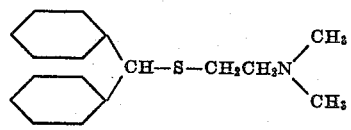

7. A compound of the formula

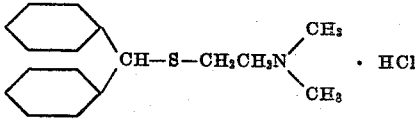

8. Process for obtaining a compound of the formula

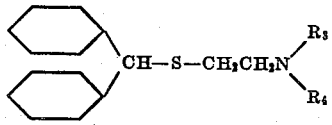

which comprises reacting a compound of the formula

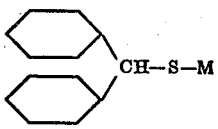

with an ω-aminoalkyl halide of the formula

where R₃ and R₄ are members of the class consisting of alkyl radicals containing 1 to 3 carbon atoms inclusive and further members wherein R₃ and R₄ taken together with —N< form a saturated six-membered heterocyclic ring, M is an alkali metal and X is a member of the class consisting of chlorine, bromine and iodine.

GEORGE RIEVESCHL, JR.

REFERENCES CITED

The following references are of record in the file of this patent:

UNITED STATES PATENTS

| Number | Name | Date |
|---|---|---|
| 1,723,695 | Hahl et al. | Aug. 6, 1929 |

OTHER REFERENCES

Schonberg et al., "Ber. deut. chem.," vol. 61B, pp. 2175–2177 (1928). (Copy in Pat. Off. Library.)